United States Patent
Baarman

(10) Patent No.: US 10,277,070 B2
(45) Date of Patent: Apr. 30, 2019

(54) WIRELESS POWER DISTRIBUTION AND CONTROL SYSTEM

(71) Applicant: Philips IP Ventures B.V., Eindhoven (NL)

(72) Inventor: David W. Baarman, Fennville, MI (US)

(73) Assignee: PHILIPS IP VENTURES B.V., Eindhoven (NL)

( * ) Notice: Subject to any disclaimer, the term of this patent is extended or adjusted under 35 U.S.C. 154(b) by 367 days.

(21) Appl. No.: 15/162,195

(22) Filed: May 23, 2016

(65) Prior Publication Data

US 2016/0268843 A1 Sep. 15, 2016

Related U.S. Application Data

(63) Continuation of application No. 14/107,608, filed on Dec. 16, 2013, now Pat. No. 9,350,202, which is a
(Continued)

(51) Int. Cl.
*H02J 50/10* (2016.01)
*H02J 7/02* (2016.01)
(Continued)

(52) U.S. Cl.
CPC .......... *H02J 50/10* (2016.02); *G06Q 30/0255* (2013.01); *G06Q 30/0261* (2013.01);
(Continued)

(58) Field of Classification Search
CPC .. H02J 50/10; H02J 50/50; H02J 50/80; H02J 50/40; H02J 17/00; H02J 7/025;
(Continued)

(56) References Cited

U.S. PATENT DOCUMENTS 5,301,096 A 4/1994 Klontz et al.
5,696,824 A 12/1997 Walsh
(Continued)

FOREIGN PATENT DOCUMENTS

CN 1691603 A 11/2005
CN 1695283 A 11/2005
(Continued)

OTHER PUBLICATIONS

PCT Search Report and Written Opinion dated Dec. 30, 2010 for PCT Application No. PCT/US2010/040139 filed Jun. 28, 2010.
(Continued)

*Primary Examiner* — M Baye Diao
(74) *Attorney, Agent, or Firm* — Larry Liberchuk

(57) ABSTRACT

A wireless power distribution and control system may be used to supply power wirelessly to various devices. The devices in the system may have control over the system and/or over certain features of other devices. For example, a smartphone charging in the wireless power distribution and control system may have access to and control over other devices in the system, such as the overhead lights, or a projector in a conference room. The identification of other devices, as well as commands for controlling these devices may be communicated over the wireless power link. The type and degree of control of each device in that system may vary based on access control levels for the power supplies and connected devices. The devices that receive power may be configured to automatically connect with the power distribution system and to monitor the other devices connected to the system.

20 Claims, 15 Drawing Sheets

Related U.S. Application Data continuation of application No. 12/791,560, filed on Jun. 1, 2010, now Pat. No. 8,618,770.

(60) Provisional application No. 61/236,388, filed on Aug. 24, 2009.

(51) Int. Cl.
| | | |
|---|---|---|
| *H02J 50/80* | (2016.01) | |
| *G06Q 30/02* | (2012.01) | |
| *H04L 12/10* | (2006.01) | |
| *H02J 50/40* | (2016.01) | |
| *H02J 7/00* | (2006.01) | |

(52) U.S. Cl.
CPC ............. *H02J 7/025* (2013.01); *H02J 50/40* (2016.02); *H02J 50/80* (2016.02); *H04L 12/10* (2013.01); *H02J 2007/0001* (2013.01); *Y04S 50/14* (2013.01)

(58) Field of Classification Search
CPC .............. H02J 5/005; H02J 2007/0001; G06Q 30/0261; G06Q 30/0255; H04L 12/10; Y04S 50/14
USPC .................. 307/104; 320/108; 455/41.1, 573
See application file for complete search history.

(56) References Cited

U.S. PATENT DOCUMENTS

| | | | |
|---|---|---|---|
| 5,898,579 | A | 4/1999 | Boys et al. |
| 6,868,349 | B2 | 3/2005 | Fletcher et al. |
| 6,870,475 | B2 | 3/2005 | Fitch et al. |
| 6,965,816 | B2 | 11/2005 | Walker |
| 7,020,701 | B1 | 3/2006 | Gelvin et al. |
| 7,276,703 | B2 | 10/2007 | Berkcan et al. |
| 7,612,528 | B2 | 11/2009 | Baarman et al. |
| 7,802,297 | B2 | 9/2010 | Bennett et al. |
| 7,805,129 | B1 * | 9/2010 | Issa .................. H04N 21/41407 370/310 |
| 7,844,306 | B2 * | 11/2010 | Shearer .................. H02J 17/00 455/573 |
| 7,987,360 | B2 | 7/2011 | Luo et al. |
| 8,099,140 | B2 | 1/2012 | Arai |
| 8,198,858 | B2 | 6/2012 | Kim et al. |
| 8,223,508 | B2 | 7/2012 | Baarman et al. |
| 8,861,502 | B2 * | 10/2014 | Soliman ................ H04W 48/14 370/328 |
| 2003/0097597 | A1 * | 5/2003 | Lewis ................... H04L 63/083 726/7 |
| 2004/0004460 | A1 | 1/2004 | Fitch et al. |
| 2004/0130915 | A1 | 7/2004 | Baarman |
| 2005/0222933 | A1 | 10/2005 | Wesby |
| 2006/0113955 | A1 | 6/2006 | Nunally |
| 2007/0072474 | A1 | 3/2007 | Beasley et al. |
| 2007/0162337 | A1 | 7/2007 | Hawkins et al. |
| 2007/0223398 | A1 | 9/2007 | Luo et al. |
| 2007/0247005 | A1 | 10/2007 | Tetlow |
| 2008/0001572 | A9 | 1/2008 | Baarman et al. |
| 2008/0150475 | A1 * | 6/2008 | Kato ...................... H02J 7/022 320/107 |
| 2008/0157603 | A1 | 7/2008 | Baarman et al. |
| 2008/0231211 | A1 | 9/2008 | Baarman et al. |
| 2008/0252419 | A1 | 10/2008 | Batchelor et al. |
| 2008/0258679 | A1 | 10/2008 | Manico et al. |
| 2008/0309452 | A1 | 12/2008 | Zeine |
| 2009/0058361 | A1 | 3/2009 | John |
| 2009/0106567 | A1 | 4/2009 | Baarman |
| 2009/0141692 | A1 * | 6/2009 | Kasslin ................ H04W 48/16 370/338 |
| 2009/0284082 | A1 * | 11/2009 | Mohammadian .... G06K 7/0008 307/104 |
| 2010/0171461 | A1 | 7/2010 | Baarman et al. |
| 2010/0271296 | A1 | 10/2010 | Kopychev et al. |
| 2011/0022116 | A1 | 1/2011 | Lee et al. |

FOREIGN PATENT DOCUMENTS

| | | |
|---|---|---|
| CN | 101383435 A | 3/2009 |
| EP | 0 820 653 B1 | 6/1999 |
| EP | 1 758 304 A1 | 2/2007 |
| JP | 2001-309457 A | 11/2001 |
| JP | 2005-184487 A | 7/2005 |
| JP | 2007-282477 A | 10/2007 |
| JP | 2007/336717 A | 12/2007 |
| JP | 2008-035108 A | 2/2008 |
| JP | 2008-154446 A | 7/2008 |
| JP | 2008/283804 A | 11/2008 |
| JP | 2009-148151 A | 7/2009 |
| KR | 10-2007-0014162 A | 1/2007 |
| WO | WO 96/32768 | 10/1996 |
| WO | WO 2004/038890 A1 | 5/2004 |
| WO | WO 2004/073176 A2 | 8/2004 |
| WO | WO 2008/140241 A2 | 11/2008 |
| WO | 2009014125 A1 | 1/2009 |

OTHER PUBLICATIONS

First Office Action and Search Report (with English translation) dated Feb. 20, 2014 for China Patent Application No. 201080047882 (22 pp.).

First Office Action and Search Report (with English translation) dated Jan. 23, 2014 for China Patent Application No. 201080047884.6 (14 pp.).

Notification of Reason(s) for Refusal (English translation) dated Mar. 5, 2014 for Japanese Patent Application No. 2012-526752 (2 pp.).

Notification of Reason(s) for Refusal (with English translation) dated Jun. 3, 2015 for Japanese Patent Application No. 2014-178312 (13 pp.).

First Office Action and Search Report (with English translation) dated May 6, 2016 for China Patent Application No. 201410813929 (22 pp.).

* cited by examiner

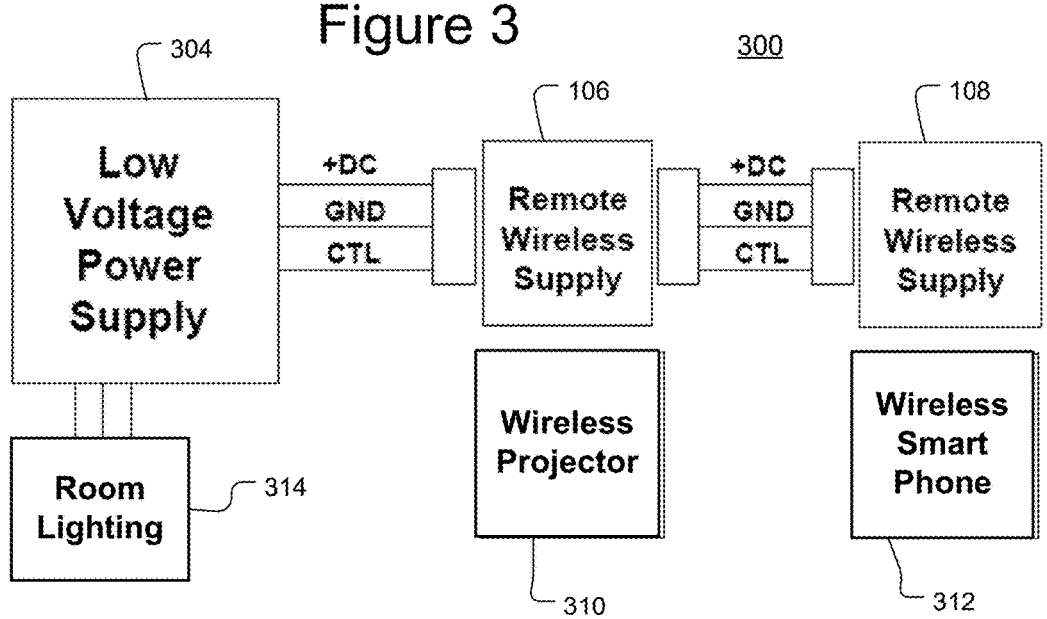
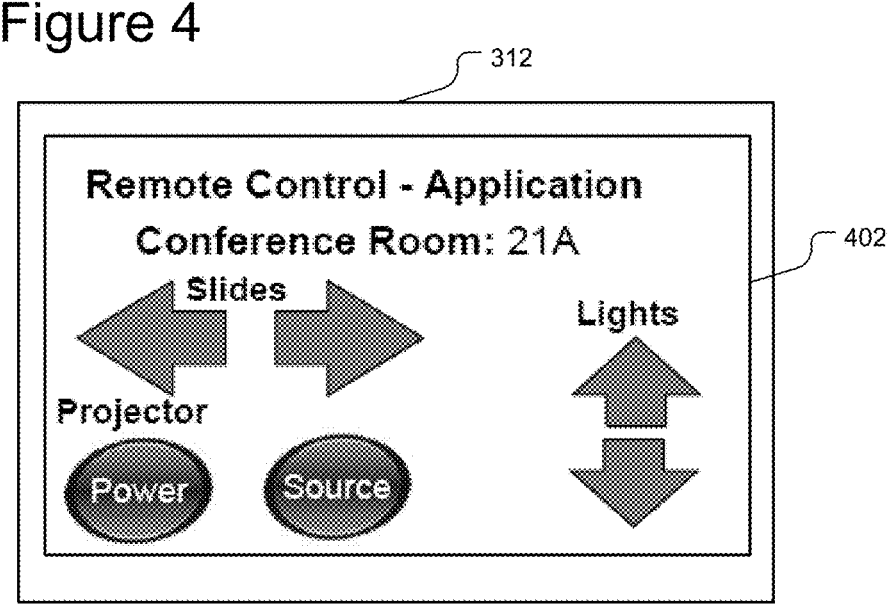

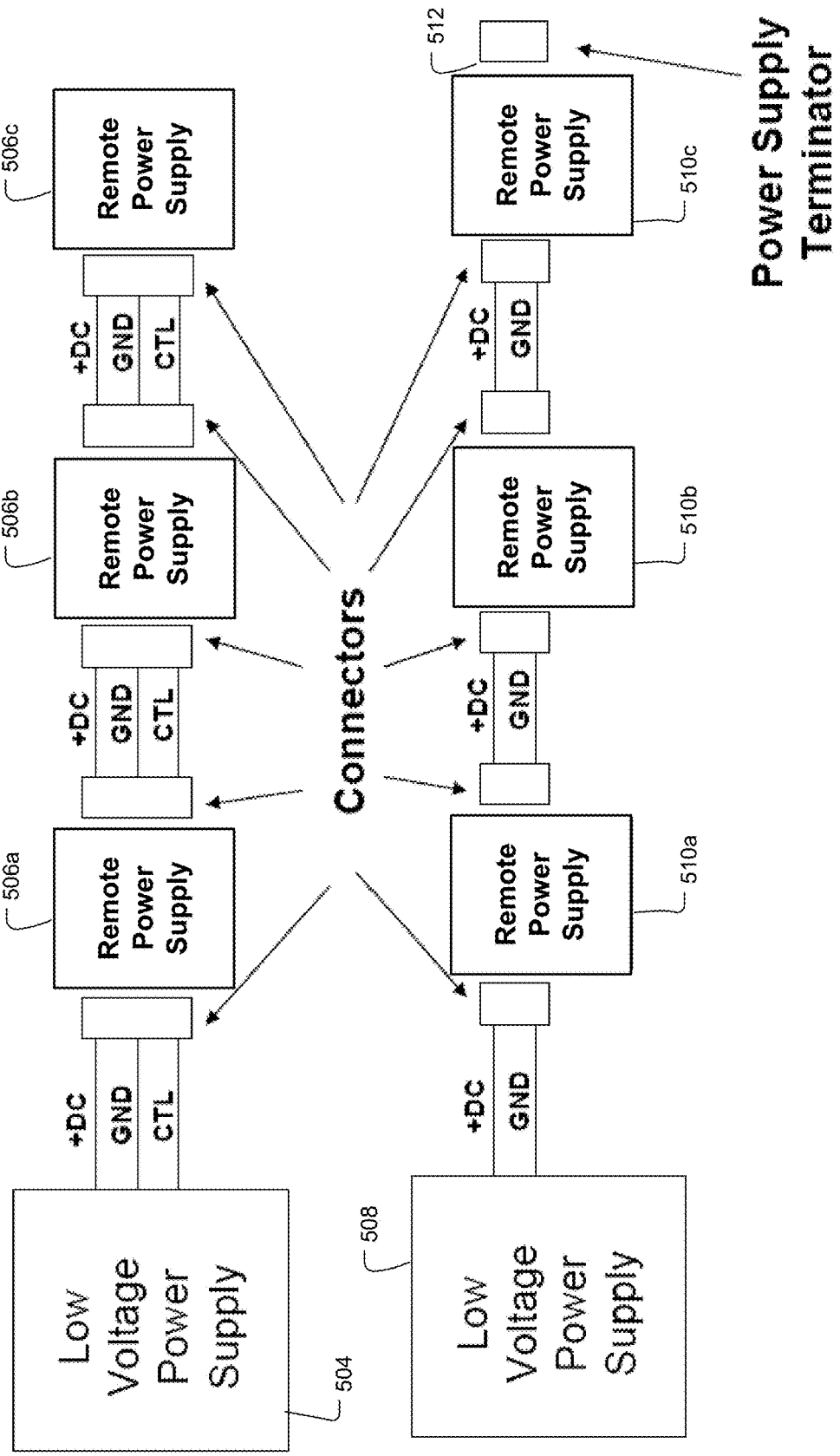

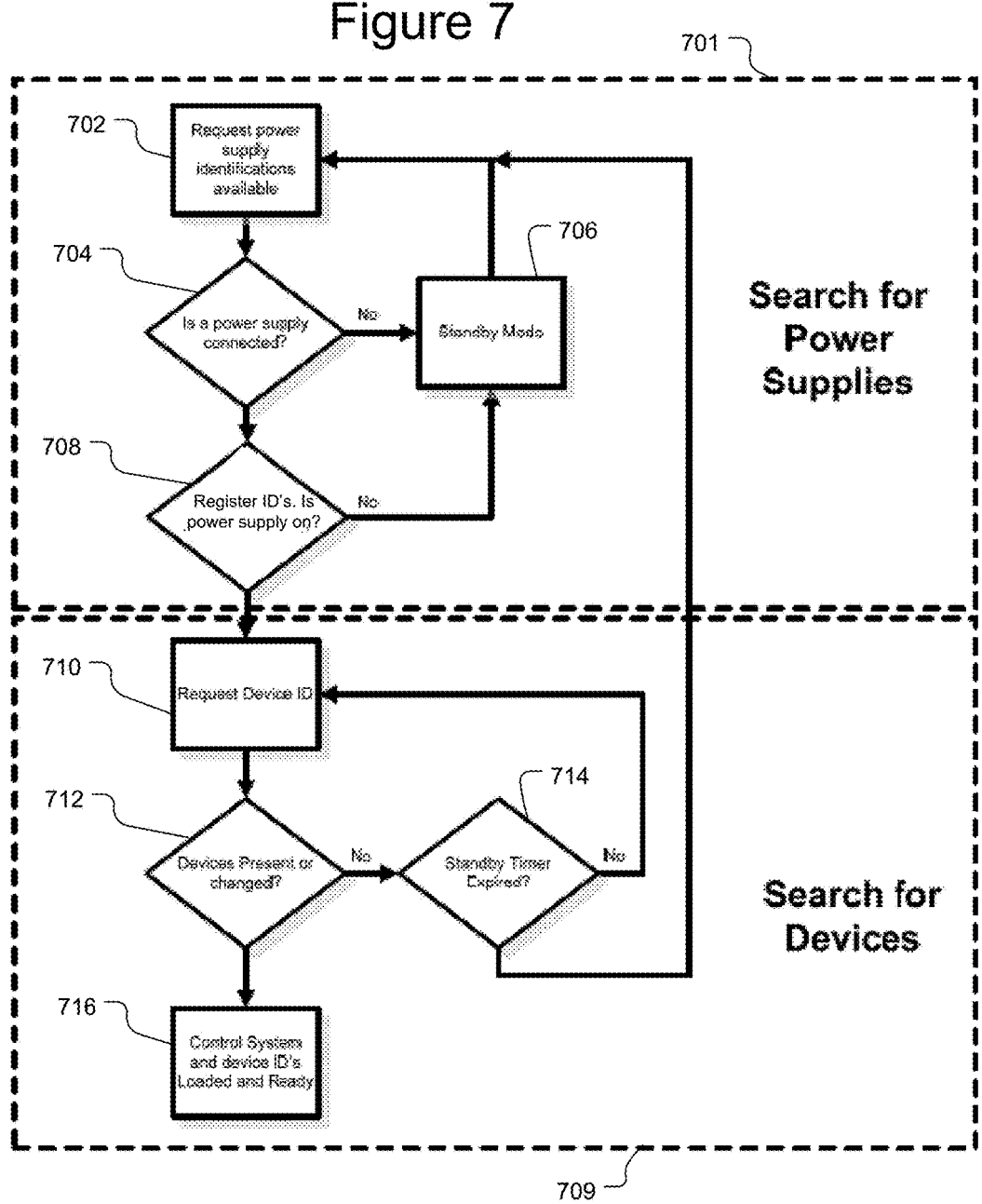

Figure 8

Wireless Power Device Control

| Device | Control | Feedback Variable | Description & Use |
|---|---|---|---|
| Lighting | Power | Binary | On/Off |
| | Dimming | Level | Level |
| | Identification | Alpha Numeric | ID - Device |
| Audio | Power | Binary | On/Off |
| | Play/Pause | Binary | Play/Pause |
| | Volume | Number | Volume Level |
| | Charge Status | Number | Charge Level |
| | Fwd/Rev | Binary | Forward/Reverse |
| | Title | Alpha Numeric | Title |
| | Identification | Alpha Numeric | ID - Device |
| Video | Power | Binary | On/Off |
| | Input Source | Number | A,B,C,D |
| | Volume | Number | Level |
| | Channel | Number | Channel No. |
| | Identification | Alpha Numeric | ID - Device |
| | Fwd/Rev | Binary | Forward/Reverse |
| | Title | Alpha Numeric | Title |
| Cell Phone | Power | Binary | On/Off |
| | Ring Mode | Number | Mute, Vibrate, Low, Med, High |
| | Charge Status | Number | Charge Level |
| | Messages | Number | No. of Messages |
| | Identification | Alpha Numeric | ID - Device |
| Laptop | Power | Binary | On/Off |
| | Charge Status | Number | Charge Level |
| | Messages | Number | Number of |
| | Emails | Number | Number of |
| | Messenger | Number | Number of |
| | Play/Pause | Binary | Play/Pause |
| | Audio/Video | Binary | Audio/Video Mode |
| | Fwd/Rev | Binary | Forward/Reverse |
| | Title | Alpha Numeric | Title |
| | Volume | Number | Level |
| | Identification | Alpha Numeric | ID - Device |
| Power Tools | Charge Status | Number | Charge Level |
| | Identification | Alpha Numeric | ID - Device |
| Wireless Supply | Identification | Alpha Numeric | ID - Location |
| | Wattage | Number | Wattage Available |
| | Power Level | Number | Present Power |
| | Device Identification | Alpha Numeric | Device ID of device present |
| | Metered Power | Number | Power usage |

Figure 9

Command Examples

| Device - ID Specific | Command Sent to Device | Return Message | Function |
|---|---|---|---|
| Audio | Volume=5 | V5 | Volume is set to 5 of 16 |
| Wireless Power Supply | ID | 1 | Supply Identification is number 1 and can be linked to a physical location like master bedroom. |
| Cell Phone | MSG | M0 | No Messages |
| Wireless Power Supply | DID | DID102120001233AppleNano | Device ID is 102120001233AppleNano |
| Lighting | PWR0 | PWR0 | Lamp is turned off |
| Cell Phone | RM0 | RM0 | Phone is Muted |

Figure 10

Hub Address Control Chart 1000

| Hub Address | Description | Low Voltage Supply Zone | Type | Power Supply Control Node ID's |
|---|---|---|---|---|
| LVC00912778@DWB00092322.com | Home Control | Bedroom | Long Term | HC0001 |
| LVC00912778@DWB00092322.com | Home Control | Living Room | Long Term | HC0002 |
| LVC00912778@DWB00092322.com | Home Control | Kitchen | Long Term | HC0003 |
| LVC00912778@DWB00092323.com | Office | Office | Long Term | OFHC31-3ADWB0001 |
| LVC00912778@DWB00092324.com | Car | Car | Long Term | SN23111999DFV23WSS1001 |
| N/A | Airplane | Airline Seat | Temporary | 21A |

WIRELESS POWER DISTRIBUTION AND CONTROL SYSTEM

PRIORITY

This application claims priority as a Continuation to U.S. application Ser. No. 14/107,608, now U.S. Pat. No. 9,350,202 (issued May 24, 2016), entitled "Wireless Power Distribution and Control System," filed on Dec. 16, 2013, which is a continuation of U.S. application Ser. No. 12/791,560, now U.S. Pat. No. 8,618,770 (issued Dec. 31, 2013), entitled "Wireless Power Distribution and Control System," filed on Jun. 1, 2010, which claims priority to U.S. Provisional Patent Application No. 61/236,388, entitled "Wireless Power Distribution and Control System," filed on Aug. 24, 2009, the entire disclosures of which are incorporated by reference herein. This application is further related to U.S. patent application Ser. No. 12/763,622, now U.S. Pat. No. 9,312,728, entitled "Physical and Virtual Identification in a Wireless Power Network," filed on Apr. 20, 2010, the entire disclosure of which is incorporated by reference herein.

BACKGROUND

There is a significant and continually increasing need for widely available access to electrical power, particularly in the field of consumer and business electronics, due to the proliferation of laptop computers, cell phones, music players, personal digital assistants and other self-powered rechargeable remote and/or portable devices that require periodic charging. In many public places, power may not be readily available to the general public because of the need for a physical power outlet for a wired connection. As such devices become more prolific and more power hungry, the availability of outlets and the need for access to electrical power sources have become more common, increasing competition by users for available outlets and causing operators of public spaces to restrict access due to the expense. This is exaggerated by the number of devices and the volume of usage per person. In addition, electric vehicle charging may now rely on the use of standard electrical outlets, which contribute to the power supply needs of the public. The expenses and technical difficulty of establishing, maintaining, and controlling the devices in a power distribution system may be significant.

BRIEF DESCRIPTION OF THE DRAWINGS

The system and method may be better understood with reference to the following drawings and description. Non-limiting and non-exhaustive embodiments are described with reference to the following drawings. The components in the drawings are not necessarily to scale, emphasis instead being placed upon illustrating the principles of the invention. In the drawings, like referenced numerals designate corresponding parts throughout the different views.

FIG. 3 illustrates an alternative wireless power distribution system;

FIG. 4 illustrates an exemplary control interface;

FIG. 5 illustrates alternative wireless power distribution systems;

FIG. 7 illustrates a process for reporting identifications;

FIG. 8 illustrates exemplary control types;

FIG. 9 illustrates exemplary control examples;

FIG. 10 illustrates exemplary hub addresses for power supplies;

DETAILED DESCRIPTION

Figure 1:
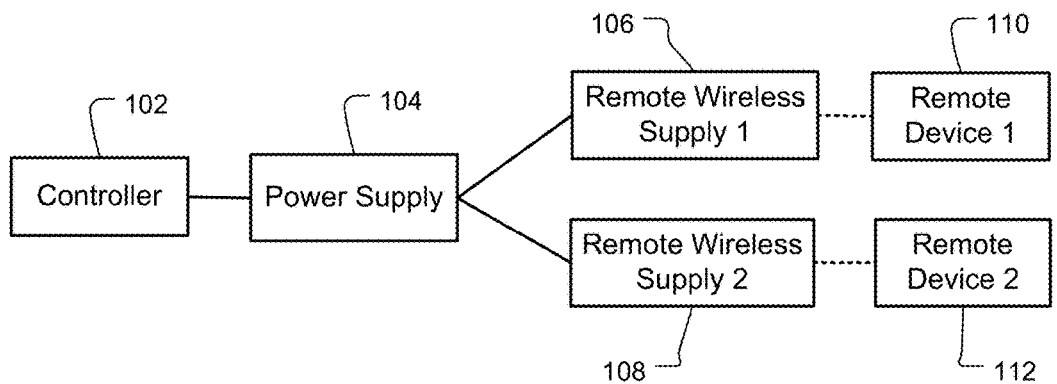
FIG. 1 illustrates a wireless power distribution system.

There is a significant and continually increasing interest in wireless power supply/delivery systems to satisfy the consumers' needs for convenient access to electrical power. Wireless power supply systems provide a variety of benefits over conventional wired connections. Most notably, they eliminate the need for various charging cords and the need to repeatedly plug in and unplug electronic devices for recharging, thereby reducing cost and improving ease and convenience of use. Publicly available wireless charging may be very convenient and useful for consumers. Accordingly, wireless power distribution systems may be established for providing power wirelessly. It may be desirable to make the electrical installation, distribution and control as simple as possible. Those power distribution systems may allow for certain devices to have access control over the system and/or other devices, such as for the purpose of regulating, measuring reporting and/or obtaining compensation for the delivery of electrical power. This control system may include device and power supply identification, as well as access restrictions for devices in the power distribution system. The identification, access restrictions, as well as control commands may be communicated via the wireless power link. One distinction between a wireless power distribution system and a traditional distribution system is that control may be an inherent aspect of wireless power. If the control causes the primary driver to oscillate, then the primary driver or wireless power supply is on. Additional relays and control circuitry may not be needed as it is already part of wireless power. One other feature is that the exchange of information and control without power connections and wires to these devices may make it convenient to configure and use.

By way of introduction, the disclosed embodiments relate to a system and method for wireless power distribution and control of devices in the system. A power distribution system may include a power supply that provides power to devices and/or components within that distribution system. In some systems, there may be a controlling device or controller that can control the other devices. The devices that receive power may be configured to automatically connect with the power distribution system and to monitor the other devices connected to the system. The control of devices may be based on commands communicated over the wireless power infrastructure. In one embodiment, the commands are communicated wirelessly as part of the wirelessly delivered electrical power that is provided by the power supply. Upon connecting with the power distribution system, the device and/or the system may establish an access level for that device. Certain devices may have access to and control over all the devices in the power distribution system. That access, as well as identifications of devices, may also be transmitted as part of the wireless power link. A particular device may be configured to receive charge by multiple power distribution systems in different environments, such as home or work.

As described, the wireless power distribution system distributes electrical power wirelessly to devices that are within the vicinity of a power supply. It will be appreciated that the range over which electrical power may be delivered wirelessly from the supply to the device is implementation dependent and may range from the device being immediately proximate to the supply to being substantially distant therefrom, such as less than 1 inch to more than 10 feet. The power distribution system may include the distribution of low voltage power in one embodiment. The distribution of low voltage power may be beneficial because low voltage distribution may not require the same degree of regulation and installation complexity. For example, low voltage regulation may not be subject to UL certification listing. A low voltage wireless power distribution system may be more easily installed, modified, and initiated. Low voltage may be defined by local and national electrical codes. In one example, a low voltage wireless power distribution system may provide power under 48 Volts of continuous current ("VDC"). Alternatively, the power distribution and control system may distribute wireless power at higher voltages. A low voltage system may also be easier to configure, install and modify without the materials and costs associated with higher voltage distribution systems.

FIG. 1 illustrates a wireless power distribution system 100. A controller 102 is coupled with a power supply 104 that provides power for remote wireless power supplies 106, 108. The remote wireless power supplies 106, 108 charge remote devices 110, 112, respectively. The remote devices 110, 112 may include a battery that must be recharged or that requires a power supply for operation. It will be appreciated that the disclosed embodiments may be used to supply power to non-battery operated devices which require delivery of operating electrical power at the time of operation. Throughout this disclosure the term charge may be used to include providing power for recharging a battery as well as providing or delivering power for reasons other than charging a battery, such as powering the device. The remote devices 110, 112 may include a cellular telephone, a Smartphone, Blackberry®, personal digital assistant (PDA), notebook/laptop computer, netbook, portable multimedia player (playing video/audio files, Blu-Ray, DVDs, CDs, etc.), video game player (e.g. Gameboy®, Playstation Portable®), mp3 player, iPod®, or any other device that may utilize stored electrical power or an electrical power source.

The remote devices 110, 112 may be configured to wirelessly receive power from the remote wireless supplies 106, 108. As illustrated, the remote device 110 is coupled with the remote wireless supply 106, and the remote device 112 is coupled with the remote wireless supply 108. In one example, each of the remote devices 110, 112 may include an adapter or other interface (not shown) for wirelessly receiving wireless power from the remote wireless supplies 106, 108, each of which may also include a corresponding adapter or interface (not shown). Adapters for the power supply system 100 may connect with a standard electrical outlet for receiving wired power from the power supply 104. The adapters may be used for devices that may not otherwise be capable of receiving wireless power. The devices may plug into the adapter which receives the wireless power and then delivers it to the devices over the adapter connection. There may be a uniform adapter that provides power to a number of different devices. For example, the uniform adapter may include multiple plugs that fit different devices for providing charge upon receiving power wirelessly. The wireless power transfer and adapter may be further described in U.S. Pat. Pub. No. 2004/0150934, entitled "ADAPTER," which is hereby incorporated by reference.

Figure 2:
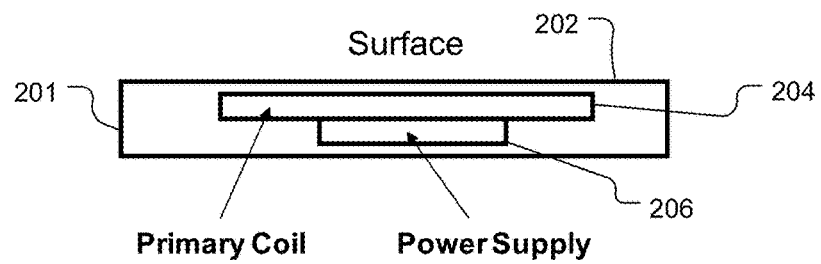
FIG. 2 illustrates an exemplary surface providing wireless power delivery.

The power supply 104 provides power to the remote wireless power supplies 106, 108, and the remote wireless power supplies 106, 108 wirelessly provide power to the remote devices 110, 112 to charge or otherwise operate the devices. As described, the power or energy may be in the form of an electric current (AC or DC) that is passed from an electrical outlet or supply terminal to the remote device. The power may be provided through induction that generates an electrical current at the consumer's device that charges the device. Voltage properties or current properties of the power supply 104 may be controlled over the wireless power network. Wireless power transfer is further described in commonly owned U.S. Pat. Pub. No. 2008/0231211, entitled "POWER SUPPLY," which is hereby incorporated by reference. Wireless power charging is further described in U.S. Pat. Pub. No. 2008/0079392, entitled "SYSTEM AND METHOD FOR INDUCTIVELY CHARGING A BATTERY," and U.S. Pat. Pub. No. 2007/0042729, entitled "INDUCTIVE POWER SUPPLY, REMOTE DEVICE POWERED BY INDUCTIVE POWER SUPPLY AND METHOD FOR OPERATING SAME," both of which are hereby incorporated by reference. FIG. 2 illustrates an exemplary surface for wireless charging.

The controller 102 may be a computer that is operative for configuring the wireless power distribution system. For example, the controller 102 may be used for establishing access restrictions for each remote device that is being or seeks to be charged by the system 100. The controller 102 may be a computer or other computing device for accessing instructions stored on a computer readable medium as described below. Alternatively, the controller 102 may include one or more processors configured for executing computer program logic or other instructions stored in one or more memories. The controller 102 may further include an interface for accessing the stored instructions or other data stored in the one or more memories. As described with respect to FIG. 6, the controller 102 may be coupled with a network, such as the Internet, and includes an interface for modifying the wireless power distribution system. The controller 102 may be used for establishing or modifying the access or control from a particular device. For example, the access may include which other devices that particular device can control as well as individual features of the other devices that may be controlled. As discussed below, the controller 102 may identify the device that is being charged. The identification may utilize the communication described in the U.S. Provisional Pat. App. No. 61/142,663, entitled "WIRELESS CHARGING SYSTEM WITH DEVICE POWER COMPLIANCE" filed on Jan. 6, 2009, and U.S. Pat. Pub. No. 2008/0157603, entitled "INDUCTIVE POWER SUPPLY WITH DEVICE IDENTIFICATION," both of which are hereby incorporated by reference. One of the remote devices 110, 112 may have control over other devices, in which case, the controlling remote device may identify or receive identification about the other devices in the wireless power distribution system.

In one embodiment, the wireless power may be transferred to a remote device automatically with limited or no user interaction. For example, when a consumer with his/her remote device enters into a wireless charge area, the remote device may automatically begin receiving wireless power after the remote device is identified. The wireless charge area may include the range that the wireless power is available over. When the remote device is within range, it may automatically receive power until it is fully charged, at which time, it may stop receiving power. When a device is brought within range of a wireless power supply (e.g. power supply 104 and/or remote wireless supplies 106, 108), the presence of the device may be detected. The power supply may then interrogate the device to identify it, validate the device's access level for receiving power and then continue to deliver power. If the device is not authorized or allowed access, the wireless power supply may stop supplying power to that device. Alternatively, automatic charging may require a confirmation from the consumer on whether the remote device should be wirelessly charged, and/or a confirmation from the power supply that charging is allowed. The remote device may detect that it is within the wireless power range and provide a Yes/No option for the consumer to decide whether to receive wireless power to the remote device. The remote device may automatically request or receive identification and information on the system, the power supplies, and/or other devices. This information may be communicated via the wirelessly provided power, such as via selective/controlled modulation of the transmitted energy. This information may be used for establishing control over certain devices in the system.

FIG. 2 illustrates an exemplary surface providing a wireless charge. The power supply equipment 202 may include a wireless charger 201 with a surface 202 that is adjacent a primary coil 204 coupled with a power supply 206. The power supply 206 provides current to the primary coil 204 for generating a magnetic field. When a device, such as one of the remote devices 110, 112, is disposed on or near the surface 202, a charge is induced in a secondary coil in the remote device from the primary coil 204. The wireless charger 201 may be located in each of the remote wireless supplies 106, 108 illustrated in FIG. 1. In alternative embodiments, a single wireless charger 201 may charge multiple devices. The power supply equipment 202 may include a single large wireless charger 201 that charges multiple devices. The wireless charger 201 may be located in a home, office, coffee shop, auditorium, or other environment as described with respect to FIGS. 12-15. Alternatively, the wireless charger 201 may be located with airport seating, train seating, airplane seating, fold down tables, or restaurant tables for providing a wireless charge. Surfaces, such as a desktop, work surface, or table may also be equipped with the wireless charger 201.

The communications of information over the wireless power connection may include modulation of the wireless power. In one embodiment, the inductive coupling of a device with a power supply is used for wirelessly transferring power to the device from the power supply. As part of the wireless connection, information may be transmitted to the device from the power supply. As described below, that information may include a listing of other devices in the system or connected to the power supply, as well as access restrictions, control codes, and/or commands for controlling other devices. In one embodiment, load modulation may be used to communicate from the device to the power supply. The modulation may occur while the load is powered for reasons of simplicity and cost. The system may be designed to listen or pause. This communications methodology may be adopted for transmitter and receiver designs. For example, either rail voltage modulation or frequency-shift keying ("FSK") modulation may be used for wireless communication from the power supply to the receiver. Although it may be more difficult to receive signals while powering a device, known decoding technology may be utilized for receiving these messages. Each power channel or device being charged may establish a communications link through this power control channel. This data may then be shared via the two and three wire communication channel between remote wireless power supplies. This allows many devices to be multiplexed or many power channels to facilitate many devices all communicating independently to the system.

FIG. 3 illustrates an alternative wireless power distribution system 300. As shown in FIG. 3, remote devices 110, 112 from FIG. 1 may include room lighting 314, a wireless projector 310, and a wireless smartphone 312. The low voltage power supply 304 may provide power to the remote wireless supplies 106, 108. The three wire connection from the low voltage power supply 304 is discussed below with respect to FIG. 5. As shown, the remote wireless supply 106 wirelessly provides power to the wireless projector 310, and the remote wireless supply 108 provides power to the wireless smartphone 312. The room lighting 314 is powered by the low voltage power supply 304, or it may be wirelessly powered.

The wireless smartphone 312 may be a controlling device or controller. It may be equipped with software for communicating with the wireless power distribution system 300 to identify the devices that are in the system and the functions of those devices that may be controlled. Exemplary commands that are communicated by the smartphone 312 for controlling other devices are shown in FIGS. 8-9. The control of any device from another device may be determined by access restrictions or control codes for the controlling device or the controlled device. As shown, the wireless smartphone 312 may control the room lighting 314. In one embodiment, the access restrictions may allow for complete control of the room lighting 314, or may only allow for an on/off function control as opposed to a dimmer control. The wireless smartphone 312 may also control the low voltage power supply 304 or any of the remote wireless supplies 106 over the wireless connection by adjusting or modifying the power supply properties, such as voltage or current.

FIG. 4 illustrates an exemplary control interface 402. The smartphone 312 may include a displayed interface 402 through which other devices on the wireless power distribution system may be controlled. As shown on the exemplary control interface 402, the smartphone 312 may control the slides of the wireless projector 310, as well as the power and source for the wireless projector 310. In addition, the smartphone 312 controls the room lighting 314. The exemplary control interface 402 is merely an exemplary interface through which a remote device can control other devices in a wireless power distribution network. The software that is present on a controlling device may include user interface functionality for receiving commands from a user, as well as including information on the identification of devices, and the commands that control those devices as described with respect to FIGS. 8-9. In one embodiment, when a device with access control over other devices is in a proximity of a wireless power supply, the software of the device automatically communicates with the power supply to identify the power supplies and any devices present in the system. The identification of the devices may be necessary for the device to be able to provide control over those devices.

Device identification of wirelessly powered devices may be made upon connection to the system or the system may periodically poll the devices to determine who is presently connected. As described, a device that is receiving wireless power from a power supply or remote power supply in the system may be described as connected or within the system. The device may communicate with the system through a "push" communication to the system, or it may wait for a request for identification from the system. The system may then maintain a device table or directory which lists the devices connected at any given time, the address of the device for uniquely communicating with it, and a time stamp as to when the device was last reported to be present. In addition, the list may include previously connected devices, which do not have to communicate all their identification information when they again connect with the system. If the time stamp expires, the device may need to be re-polled. In a push system, the devices may identify themselves repeatedly or periodically to maintain the table entry. When devices connect, they may be assigned addresses. In one embodiment, the addressing may be through a system similar to a Dynamic Host Configuration Protocol ("DHCP") addressing system used by computers to obtain internet protocol ("IP") addresses over a Wi-Fi network. In one embodiment, device serial numbers may be used as part of the addressing system. Through the use of a DNS type system a user can identify a device such as "projector in conference room 21A" using an easily recognizable name which gets translated into the computer recognizable address. This name may also be stored in the directory. In some wireless power delivery systems, there may be domains and sub-domains for the addressing scheme allowing addressing of devices in a single room or across the entire building. In one example, a wireless power delivery system in a school may give a teacher control of devices in a room, while a janitor may have control of all devices in the building.

FIG. 5 illustrates an alternative wireless power distribution system. In particular, FIG. 5 illustrates a wireless power distribution system with a three-wire connection from the low voltage power supply 504 and with a two-wire connection from the low voltage power supply 508. The remote devices 506*a-c* are coupled with a three-wire connection to the low voltage power supply 504. The remote devices 510*a-c* are coupled with a two-wire connection to the low voltage power supply 508. Both the two-wire and the three-wire connections include a +DC power cable and a ground GND cable. The three-wire embodiment utilizes a control signal CTL that provides for data communication with remote devices that are wirelessly powered by the system. The CTL signal may include an RS232 full duplex transmission path for devices to communicate with the wireless power distribution system and for the system to communicate with attached devices. The communication may include the identification of devices and/or power supplies, as well as commands for controlling those other devices and/or power supplies. In the two wire system, the communication may be passed through the +DC power cable. The terminator 512 may be used in either two or three wire systems to allow the power system to monitor or understand the losses across the wires. In one embodiment, this may be accomplished by measuring and communicating the voltage at these points back to the supply allowing the system to monitor and adjust voltage if needed. Although FIG. 5 illustrates the terminator 512 at the end of the system, each node or wireless power supply may also provide the power supply with measured voltage data to control the voltage within suitable thresholds for each supply.

In FIG. 5, there may be multiple power supply as part of a single wireless power delivery system, or each power supply may be part of a singular wireless power delivery system. There may be a central controller for the building, or there may be controllers for each power supply. In a building, there may be power supplies in each room with remote power supplies throughout the room, or there may be a central power supply in the building that connects with all the remote power supplies in each room. There may be multiple controllers or a hierarchy of controllers so as to sub-divide the building into sections. The remote power supplies may be access points in which a device connects with and receives power from the nearest remote power supply.

Figure 6:
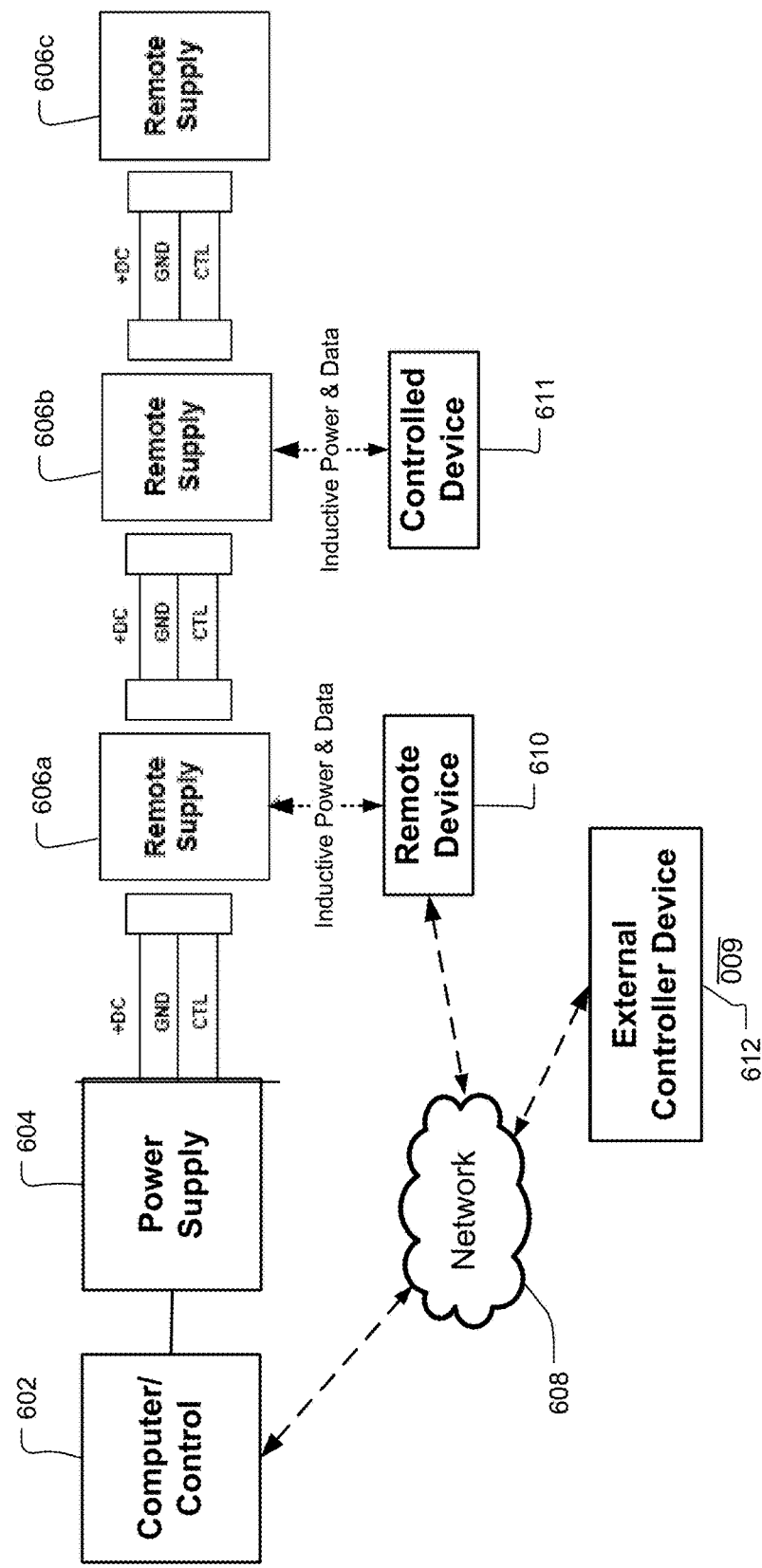
FIG. 6 illustrates an alternative wireless power distribution system.

FIG. 6 illustrates an alternative wireless power distribution system 600. In particular, FIG. 6 illustrates a connection with an external network 608 by components of the system 600 that allows for control of the wireless power distribution system 600 or devices/supplies in that system 600 over the network 608. The network 608 may connect any of the components to enable communication of data and may include wired networks, wireless networks, or combinations thereof. The wireless network may be a cellular telephone network, a network operating according to a standardized protocol such as IEEE 802.11, 802.16, 802.20, published by the Institute of Electrical and Electronics Engineers, Inc., WiMax network, or other wireless network or combination thereof. Further, the network 608 may be a public network, such as the Internet, a private network, such as an intranet, or combinations thereof, and may utilize a variety of networking protocols now available or later developed including, but not limited to TCP/IP based networking protocols. The network(s) may include one or more of a local area network (LAN), a wide area network (WAN), a direct connection such as through a Universal Serial Bus (USB) port, and the like, and may include the set of interconnected networks that make up the Internet. The network 608 may include any communication method or employ any form of machine-readable media for communicating information between devices, or from the device to the system.

The wireless power distribution system 600 of FIG. 6 includes a computer/control 602 coupled with a power supply 604, that powers remote supplies 606*a-c*. A remote device 610 is wirelessly powered at the remote supply 606*a*, and the controlled device 611 is wirelessly powered by the remote supply 606*b*. An external controller device 612 is coupled with the network 608. The remote device 610 and the computer/control 602 may each be connected with the network 608 for transmitting information. In one embodiment, the external controller device 612 may have access into the wireless power distribution system. For example, a user at work may utilize a computer or smartphone to access the home wireless power distribution system in order to dim any lights or otherwise control devices being wirelessly powered within the wireless power distribution system. Likewise, the remote device 610 may communicate over the network 608 to provide control over the other devices, such as the controlled device 611, or to access and/or modify the computer/control 602. Alternatively, since the remote device 610 is a local device, it may communicate with, and control, other devices in the system with the wireless power distribution. In one embodiment, there may be a web site through which the computer/control 602 is interfaced for controlling the wireless power distribution system 600. The data that is transmitted over the network 608 may include a recognition/identification of devices on the system, as well as commands from the device(s) with access to other devices. Load modulation may be used to communicate from the remote supplies to the primary power supply 604. The primary power supply 604 may use either rail voltage modulation or frequency-shift keying ("FSK") modulation to communicate to the remote power supplies. Simple communications may be needed with lower data rates to allow a full range of control.

FIG. 7 illustrates a process for reporting identifications in a wireless power distribution system. In one embodiment, the computer/control 602 of FIG. 6 or the controller 102 of FIG. 1 monitor the wireless power distribution system to determine the presence of power supplies and/or devices as well as identifications for each power supply and/or device. In particular, block 701 illustrates the search for power supplies and block 709 illustrates the search for devices. In block 702, the available power supply identifications are requested. The wireless power distribution system may initially determine whether there are any power supplies available based on a list of power supply identifications. The list of power supplies may include a historical list of any power supplies that have been used within that system. Using the power supply list, the connection of each of the power supplies is determined in block 704 to identify connected power supplies. When no power supplies are connected, the system may be in standby mode as in block 706. When a power supply is connected, the identifications of the power supply are registered and the status of the power supply may be checked. In particular, if the power supply is not on as in block 708, then the device may wait in standby mode in block 706 for an available, connected power supply that is also turned on. Regardless of whether the power supply is on or off, the available and connected power supplies are registered with the system. The registration may include recording an identification of the available and connected supplies that may be used by controller devices or other devices for receiving wireless power from the power supplies. Based on the identifications, the system should know the power supplies that are available and connected, and the system should also be able to determine when those supplies are turned on or off.

While the system identifies available, connected, and active power supplies in block 701, the system may also search for devices in block 709. The power supplies may have a simple control line between them to communicate and identify additional power supplies. A master power supply may be the supply that is connected to a hub or network node to allow remote control. The power supply may first identify what power supplies are in a master/slave power supply network and assigns a specific identification by power supply and remote power supply. Each respective remote power supply may monitor for change in field or actively pings and looks for a device before it then requests an identification by powering up a device. The powering of a device after a certain time or a certain amount of power may result in the device (e.g. remote device 610) to report the device's identification. The device may then request the network control codes as in block 710. In response to the request the device may receive a preset list of allowable device identities, as well as control codes (e.g. commands) for those devices that establish how to control other devices in the system. The level of access and control may determine the data, addresses and control codes sent to the device. The device software then uses the received control codes and device addresses to show the allowable control assets ready for control. Also in block 710, a determination as to whether devices are present or changed is made in block 712. If there are no devices present or the list of devices is unchanged, a standby timer in block 714 is utilized. After the standby timer expires, the power supply identifications may again be requested from block 702. Before the standby timer has expired in block 714, the device identification is requested again in block 710. If there are new devices present or the list of devices is changed, then the control system and device identifications are loaded as in block 716. The list may include the following addresses in a node by node matrix: the hub address, the addresses (identification number) for the low voltage power supplies, the addresses (identification) for the remote wireless power supplies, and then the device identification within the network. Devices may be portable or interconnected as shown in FIG. 3, showing the lighting control 314 which may be interconnected with the network. Other controls or device can also be remote via other radio frequency ("RF") or wireless networks.

Accordingly, the wireless power distribution system maintains a list of connected and/or charging devices. The system tracks power supplies and connected devices, so that if a power supply is removed or switched off, or if a device is added/removed, the system knows which power supplies are available for charging and which devices are present. Further, the identification of power supplies and devices may be utilized by connected devices for establishing control. The computer/control 602 of FIG. 6 or the controller 102 of FIG. 1 may control any of the connected power supplies or devices. Alternatively, any device may control the power supplies or at least a subset of the other devices depending on access restrictions. For example, remote device 610 or external controller device 612 may control the controlled device 611 illustrated in FIG. 6. The list of available power supplies and devices may be received by the remote device 610 for allowing the control of the controlled device 611. Accordingly, when the remote device 610 is within a vicinity of the system including the power supply 604 or any of the remote supplies 604, the device 610 communicates with the system and receives an identification of supplies and/or devices. This listing enables the remote device 610 to control the other devices. For example, as in FIG. 3, when the wireless smart phone 312 communicates with the system and/or the remote wireless supply 108, the communication includes an identification of the wireless projector 310 and the room lighting 314. The identification combined with additional control information allow the wireless smart phone 312 to control the wireless projector 310 and the room lighting 314. The additional control information is described with respect to FIG. 8.

FIG. 8 illustrates exemplary control types. In particular, FIG. 8 illustrates a chart 800 that includes a list of devices. The chart 800 includes control commands that may also be referred to as control codes. A device that receives wireless power or otherwise has the wireless power device control information in the chart 800 stored can control other devices. This control information may be stored as part of software in a device. Alternatively, when a device is connected with the wireless power distribution system, it may wirelessly receive this control information, or it may be passed as part of the connection. As discussed above, in a two wire example, this information may be passed as part of the DC power line, or in a three wire example, there may be a communication line over which this information is provided to the power supply. The power supply can then pass the information to a wirelessly charging device. The wireless power supply may be a part of the communications between devices. The same power control element that enables power control may also enable network communications.

For each device, a control, feedback variable, and description/use illustrated in the chart 800 may be provided. The exemplary devices are lighting, audio, video, cellular phone, laptop, power tools, or a wireless supply. For each device a number of exemplary controls are illustrated. For each of the control types, a feedback variable indicates the type of communication that is transmitted for that control. The description/use describes the particular control. As shown, a lighting device has three exemplary controls: 1) power, 2) dimming, and 3) identification. The power is a binary feedback variable because it is either on or off. The dimming feedback variable is a level that represents the degree or amount of dimming. The level may include a number within a range, such as between one and ten, with one being the faintest light and ten being the strongest light. The identification may be an alpha numeric field for each of the devices that acts to identify the device. In one embodiment, the identification may be a serial number of the device.

As an additional example, the video device in the chart 800 may be a television or other display. The illustrated controls are power, input source, volume, channel, identification, forward/reverse, and title for the video device. Accordingly, the volume (as a number/level feedback variable) can be adjusted by another device. The list in the chart 800 is merely exemplary and there may be more devices that are subject to control, and the devices shown in the chart 800 may have additional or different controls and/or feedback variables for those controls.

FIG. 9 illustrates exemplary command examples. When a device within the wireless power distribution system controls other devices in that system, the controls may be passed to the other devices as commands. The chart 900 in FIG. 9 illustrates exemplary commands that are used by a controller device to control another device. For example, an audio device may receive a volume command, which as shown in the chart 800 of FIG. 9 includes a numeric feedback variable. The numeric volume command may be a five which signifies a level of volume to be set. In one embodiment, the volume may be 0 to 16. The chart 900 illustrates a return message from the controlled device that may be provided in response to receiving the command. The return message may be a confirmation of the command and an acknowledgement of satisfying that command. The devices, commands, return messages, and functions illustrated in the chart 900 are merely exemplary and there may be more devices with more commands and return messages. For example, each of the controls illustrated in the chart 800 of FIG. 8 may include one or more commands. As described in FIG. 9, the volume command for the audio device may include 17 commands for setting the volume from 0 to 16.

FIG. 10 illustrates exemplary hub addresses for power supplies. The hub address may be an aspect of the control identification that is used for the remote control over the internet. As illustrated, each master low voltage power supply may have a hub address with each power supply having a secondary address and other hot spots also being addressed for specific node control and device interfacing. The chart 1000 includes four environments for a wireless power distribution system: 1) home, 2) office, 3) car, and 4) airplane. Each of the environments may have a unique hub address. Within a particular environment, there may be multiple low voltage supply zones, such as a bedroom, living room, and kitchen within a home environment. Exemplary environments are illustrated in and described with respect to FIGS. 13-15.

As described with respect to FIG. 4, there may be domains and sub-domains of control. Based on access control restrictions, some devices may have control over certain sub-domains of a system rather than an entire domain. In one embodiment, the default access control for devices may be local devices (e.g. devices in a room), whereas external devices (e.g. devices connected over a network or the Internet) may not have control of other devices. There may be master devices that include control over the entire domain and can control the domain over a network. For example, a house may be a domain and the individual rooms are sub-domains. Local control may be present in each room, but only select devices are given control of the entire domain/house. This way you can turn off a whole house, turn off only select rooms, or turn off only select devices within a room or rooms. Access may also be segregated for allowing a parent to control all devices but a child can only control a restricted set of devices, or to prevent someone from outside a home to control things inside the home. Certain devices may require only local control to prevent a fire hazard or other situation, such as control of an oven.

The wireless power system provides localized knowledge of items or devices within a physical location. Based on that knowledge, specific and localized control of various devices may be provided. The knowledge may include a particular address or other identification. In one example, a device description, serial number, model number, or other identifier may be used for each device at a location. This address or identification information may be used for connecting or controlling that device. Utilizing the wireless power network provides a way to identify just the devices in one location, such as a particular room. That control may allow for information to be sent/received at a specific location without interference from different locations. The system has an understanding of the devices within a particular location by using the wireless power network.

A connection with the wireless power network may include receipt of an identification of devices associated with that particular network and/or location. In one example, a device coupled with a wireless power system in a particular room may be able to identify televisions in only that particular room, rather than adjacent hotel rooms. The physical location of devices may be identified by the wireless power system to avoid accessing a device in a different room. Although devices in another room may be detected, the system could identify the devices in that room. For example, a monitor, television, and printer may be in a hotel conference room and only accessible within that conference room. This detection may then be used for making a secondary wireless connection with those devices, such as through Ultra Wide Band ("UWB"). Alternative connection methods may be available including wireless USB, WAN, or through the wireless power network.

The physical location of the wirelessly charging device determines which devices are identified with that physical location. A user move from room to room and wirelessly charge their device in each room. While in each room and accessing the wireless power network, the user's device knows the devices in that room and can access/control those devices. The user can easily change rooms and while connecting with a different room's wireless power system, the user gains access/control to the devices in that different room. For example, a user can transport a laptop with a presentation to different rooms and access each room's display device or monitor for displaying the presentation. In one embodiment, the connection between devices may be through Ultra Wide Band ("UWB"). The laptop may connect with the display device through UWB to display the presentation. The identification of the display device may occur through the connection with the wireless power system. In other words, when the user connects with the wireless power system in a particular room, each of the devices in that room is identified. The user can then connect with those devices through other connection means, such as UWB.

In another example, an airplane passenger may utilize a handheld device to control all local devices associated with that passenger's seat, such as seat reclining, audio volume, television/monitor display, etc. The controlling device may be wirelessly charged at that seat and through the wireless power system, each device associated with that particular seat would be identified. Those identified devices could then be accessed or controlled by the controlling device. The control would be limited to just that particular seat and would not affect the adjacent passenger's seats. The physical location of the controlling device and its connection with the wireless power system determines which devices are controlled. The passenger may then change seats and the handheld device would then be limited to the devices associated with the new seat once the controlling device is moved to a different wireless charging location.

The controlled devices or items may vary. In a restaurant with wireless power at various tables, the user may control the lighting, blinds, audio, video, or other features associated with a particular table. The customer may put the controlling device (e.g. cellular phone or laptop) onto the table for receiving wireless power, and the device may also receive an identification of each device or item associated with that particular wireless power location. The controlling device may then access or control those identified devices or items.

Figure 11:
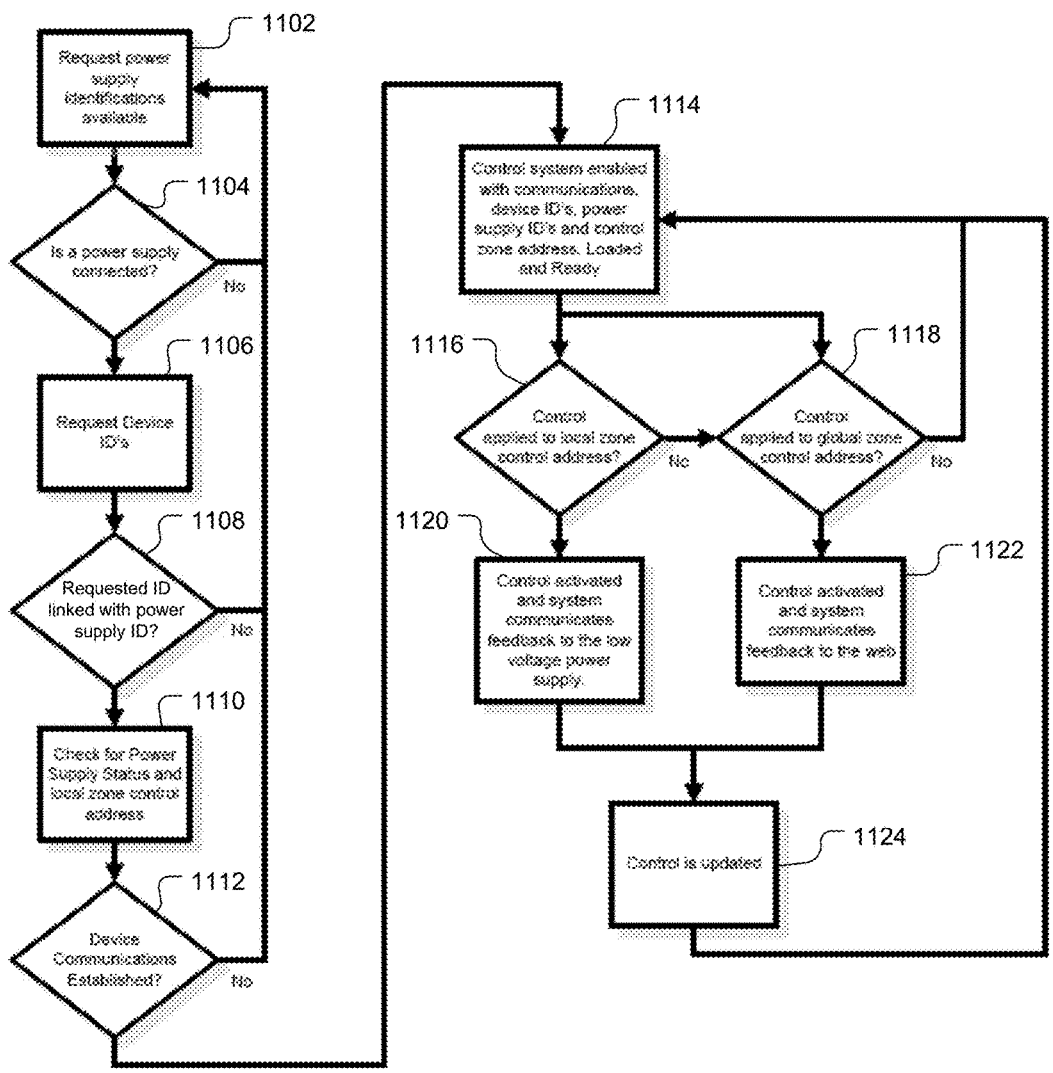
FIG. 11 illustrates a process for identifying and controlling network devices.

FIG. 11 illustrates a process for identifying and controlling other devices. In block 1102, the wireless power distribution system may request power supply identifications for those power supplies that are available. In block 1104, a determination is made as to whether the available power supplies are connected. If there are no available power supplies or no connected power supplies, the system continues to request power supply identifications in block 1102. If there are available and connected power supplies, then the system requests device identifications in block 1106. A determination is made as to whether the requested devices are linked with power supplies in block 1108. If no requested devices are linked with a power supply, the system requests power supply identifications in block 1102. The power supply status and local zone control address are checked in block 1110 when the power supply is linked with a device. The system then determines whether communications have been established with the device as in block 1112. The communications with the device may include the identifications of other devices and/or power supplies as well as commands for those devices, such as the commands in chart 800 of FIG. 8. If there are no communications with the device, then the system returns to requesting power supply identifications in block 1102.

When communications with the system and the device are established in block 1114, the system is ready for one or more devices to control other devices. The control may be dependent on access levels. In one embodiment, local devices or devices within proximity of the system may have certain access, while external devices (e.g. external controller device 612 of FIG. 6) may have different access. For example, local devices may be able to control the on/off and dimmer of room lights, but external devices may be limited to controlling the on/off switch of room lights. Each controlled device may have certain functions with differing access levels. In one embodiment, there may be a local zone and a global zone of addresses. In block 1116, if the control is not applied to the local zone, then in block 1118, the global zone is checked. If control is not applied to the global zone or the local zone, then the system continues to be ready in block 1114. If control is applied to a local zone, then the control is activated and the system communicates feedback to the power supply or a control/computer for the power supply as in block 1120. When the control is not for the local zone, but for the global zone, then control is activated and the system communicates feedback through the network or the Internet as in block 1122. The global zone is device that is located away from the system and connects with the system over a network, such as the Internet. In block 1124, the control is updated when either the control was activated over the local zone or over the global zone.

Figure 12:
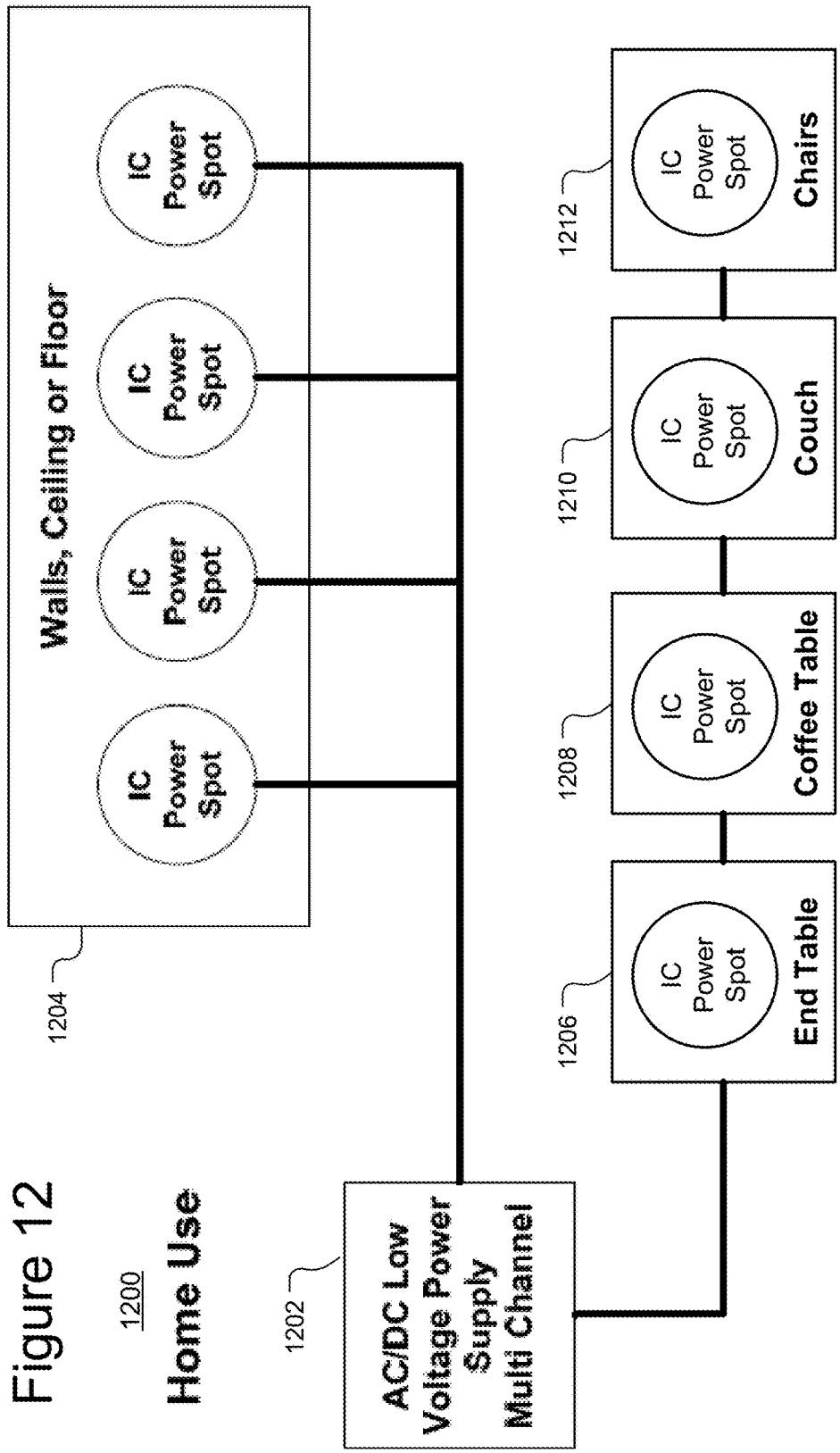
FIG. 12 illustrates a wireless power distribution system for use in a home environment.

FIGS. 12-16 illustrate various environments in which a wireless power distribution system may be used. FIG. 12 illustrates a home wireless power distribution system 1200. The system 1200 includes an AC/DC low voltage power supply multi channel 1202 that provides power to power supplies within the home environment. In particular, the system 1200 includes a power supply for the walls, ceiling, and/or floor 1204. The supply 1204 may include multiple power spots. In addition, the power supply 1202 may power an end table power spot 1206, a coffee table power spot 1208, a couch power spot 1210, and/or power spots for chairs 1212. The power spots may be remote power supplies that supply power or charge to devices wirelessly.

Figure 13:
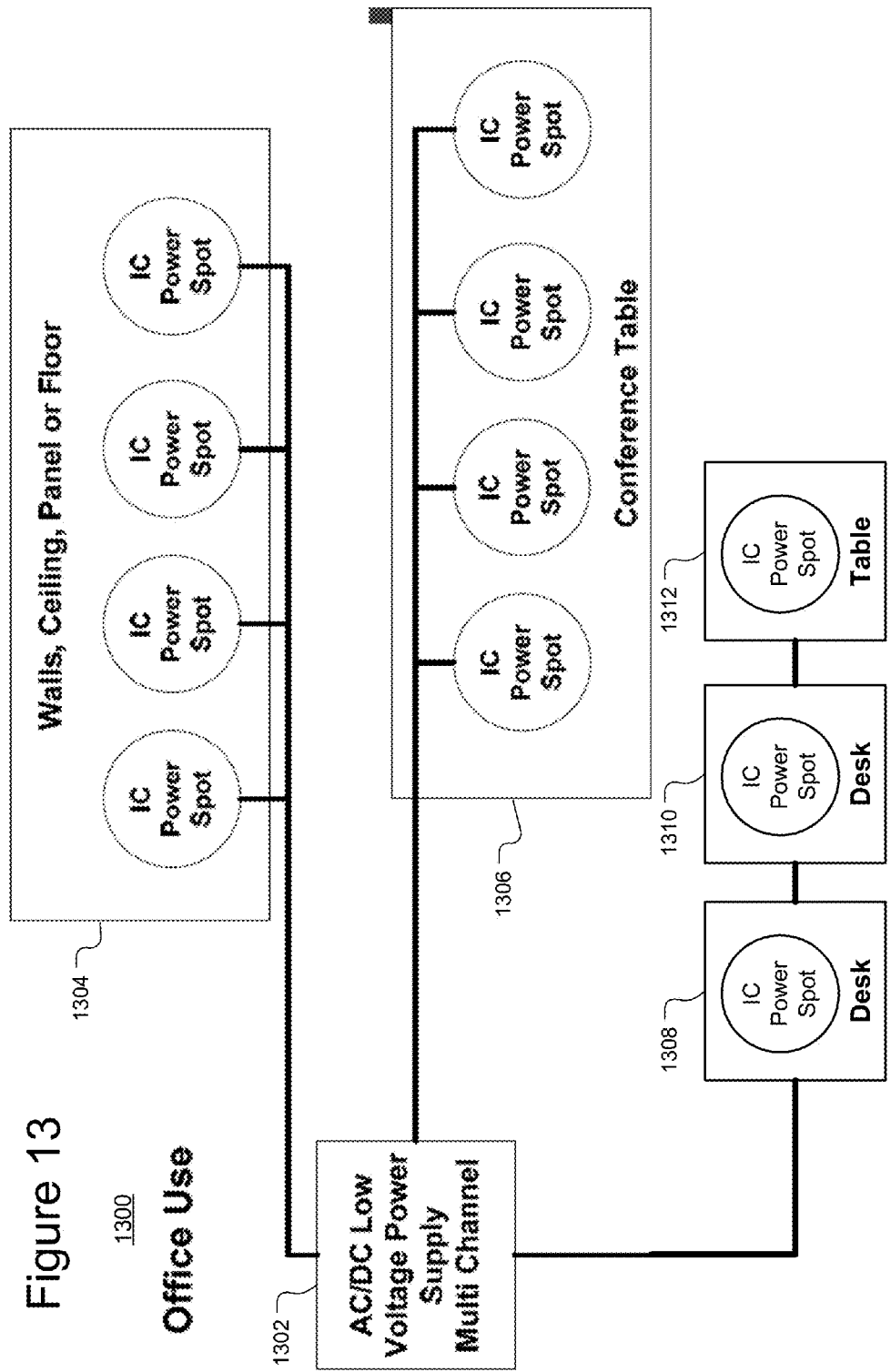
FIG. 13 illustrates a wireless power distribution system for use in an office environment.

FIG. 13 illustrates an office wireless power distribution system 1300. The system 1300 includes an AC/DC low voltage power supply multi channel 1302 that provides power to power supplies within the office environment. In particular, the system 1300 includes a power supply for the walls, ceiling, panel and/or floor 1304. The supply 1304 may include multiple power spots. In addition, the power supply 1302 may power a conference table 1306 with multiple power spots, and provide power to power spots at desks 1308, 1310, and at a table power spot 1312. The power spots may be remote power supplies that supply power or charge to devices wirelessly.

Figure 14:
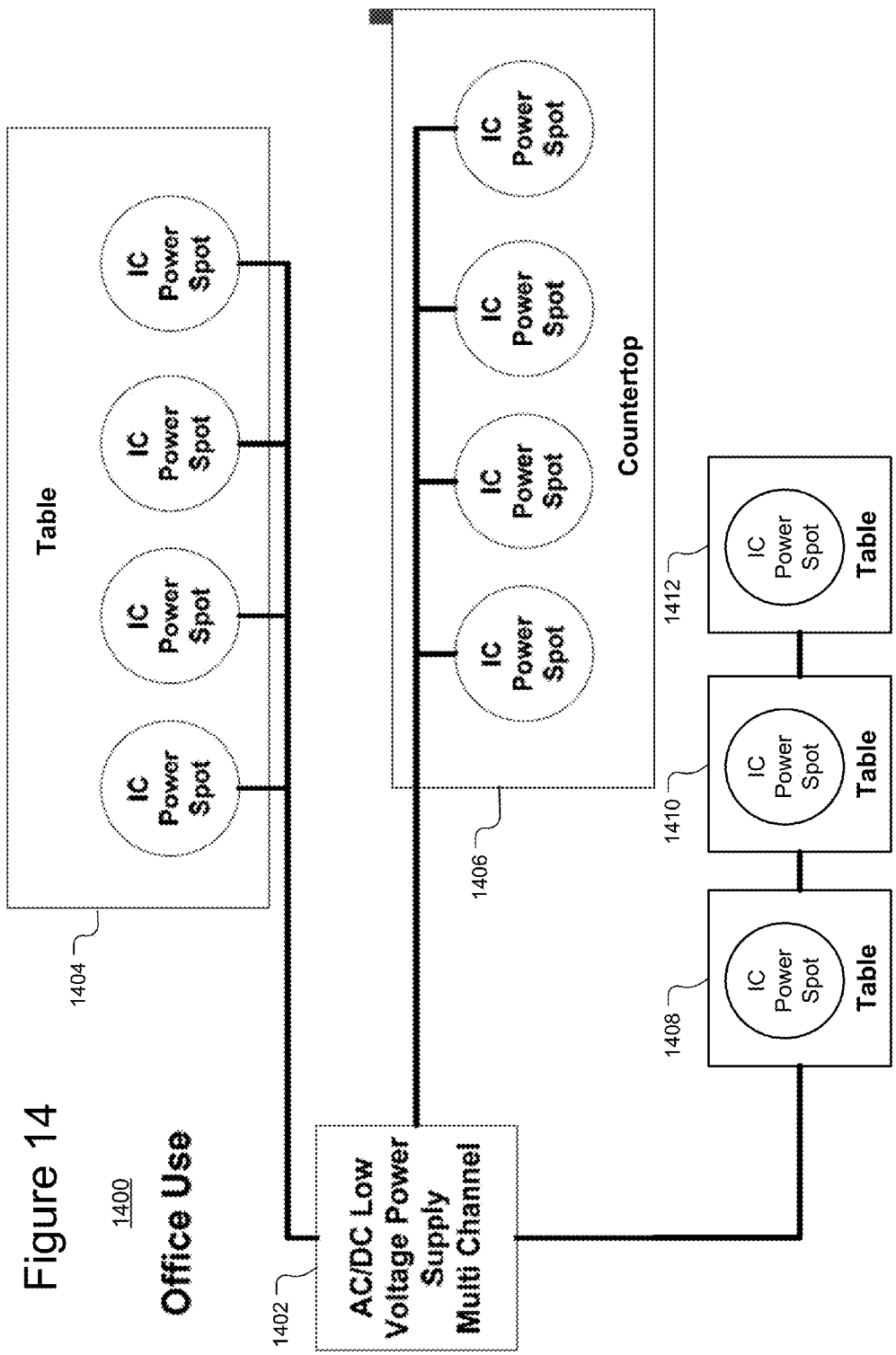
FIG. 14 illustrates an alternative wireless power distribution system for use in an office environment.

FIG. 14 illustrates an alternative office wireless power distribution system 1400. The system 1400 includes an AC/DC low voltage power supply multi channel 1402 that provides power to power supplies within an alternative office environment. In particular, the system 1400 includes a power supply for a large tabletop 1404 with multiple power spots. Likewise, the power supply 1402 powers a countertop 1406 with multiple power spots. In addition, the power supply 1402 may provide power to power spots at tables 1408, 1410, 1412. The power spots may be remote power supplies that supply power or charge to devices wirelessly.

Figure 15:
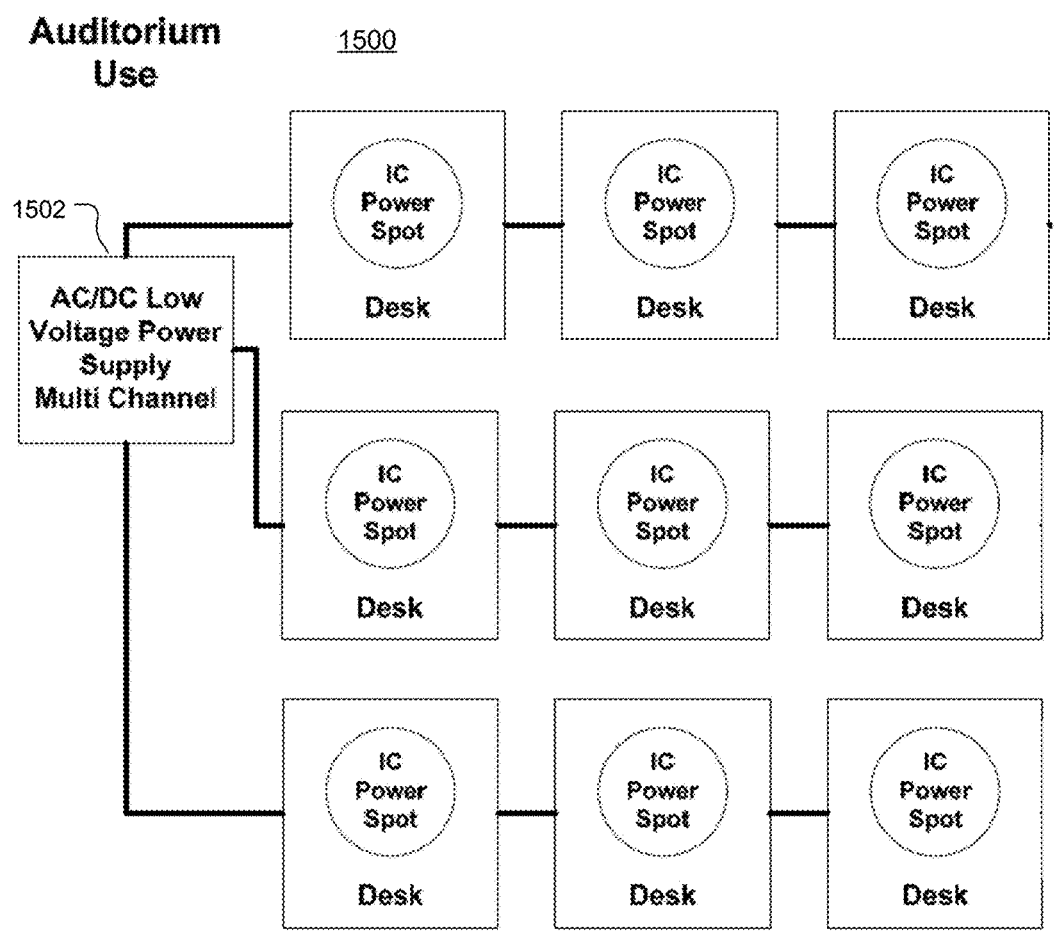
FIG. 15 illustrates a wireless power distribution system for use in an auditorium.

FIG. 15 illustrates an auditorium wireless power distribution system. The system 1500 includes an AC/DC low voltage power supply multi channel 1502 that provides power to power supplies within an auditorium. In particular, the system 1500 provides charge to individual desks or tables in the auditorium. Each desk or table may be a remote power supply. Each device may be given hub addresses, control identification, and/or control codes related to control access within each environment in which the device may be or has been wirelessly powered. Each wireless power environment may maintain a log with the hub address and control attributes and elements making a list within the device for available control features. The device may maintain a single set of identifications, control codes, and commands that it uses in each environment. The device may be programmed to understand the context of the environment and only certain present/allow commands appropriate to that environment despite including programming for other environments. Alternatively, each environment may communicated new identifications, control codes, and commands. When the device is introduced into an environment, the system may push allowed commands/functions to the device. This may allow the system to dynamically change the device's capabilities. Some environments may require a preset programming of controls/commands, but still provide the device with certain information, such as the identification information for all devices connected with the system.

Figure 16:
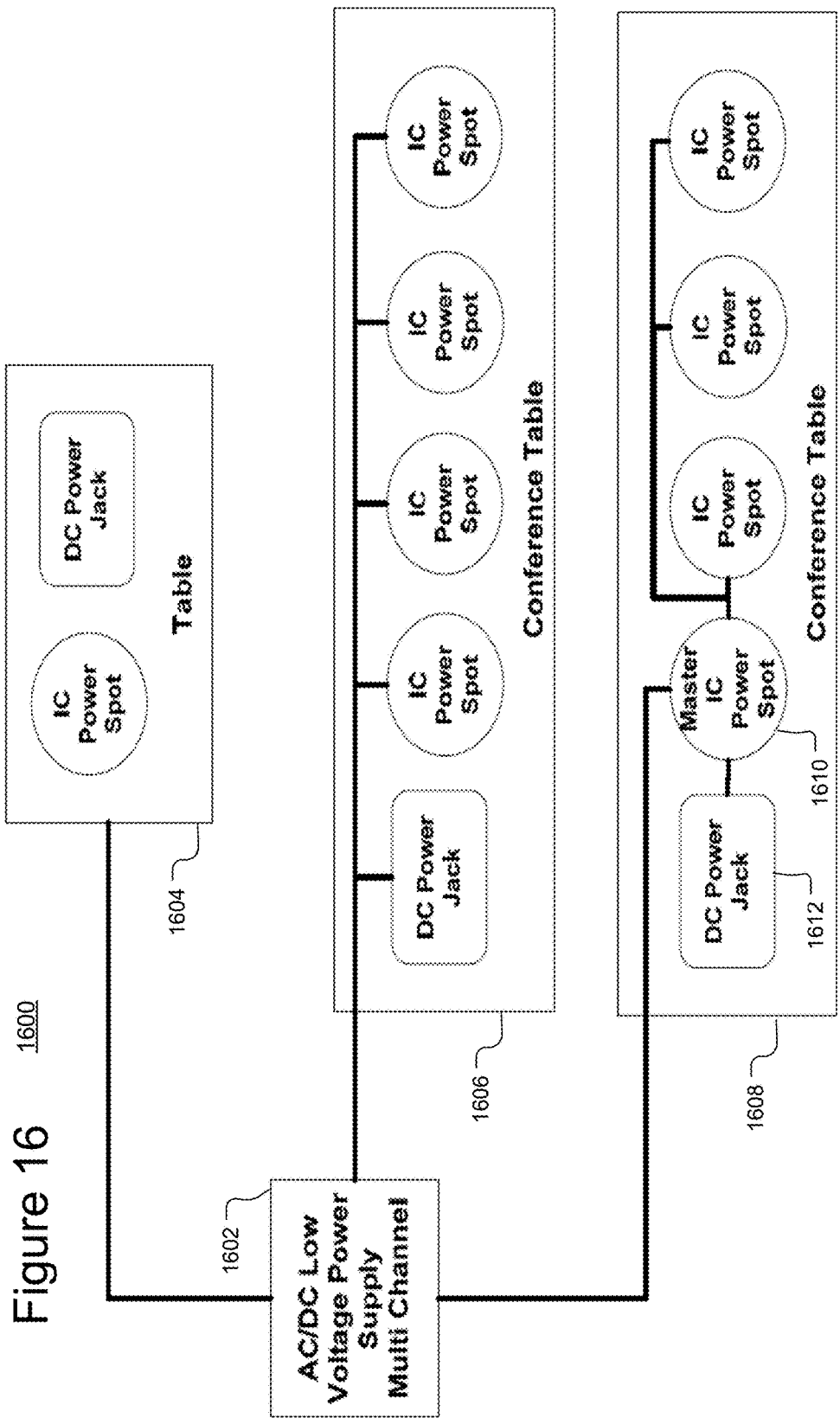
FIG. 16 illustrates a wireless power distribution system with multiple control and power options using direct current ("DC") outputs.

FIG. 16 illustrates a wireless power distribution system 1600 with multiple control and power options using direct current ("DC") outputs. The system 1600 includes an AC/DC low voltage power supply multi channel 1602 that provides power to power supplies, such as a table power supply 1604. The table power supply 1604 may include a wireless power supply as well as a DC power jack. Likewise, a conference table 1606 may include multiple wireless power spots. In addition, the conference table 1606 may also include a DC power jack. Another conference table 1608 may also include multiple wireless power spots, as well as a DC power jack 1612 that is coupled with a master power spot 1610. The master wireless power spot 1610 may control the other wireless power spots in the conference table 1608. The master wireless power spot 1610 may control the AC/DC low voltage power supply multi channel 1602, such as by controlling voltage properties or current properties of the power supply. The power spots may be remote power supplies that supply power or charge to devices wirelessly.

Figure 17:
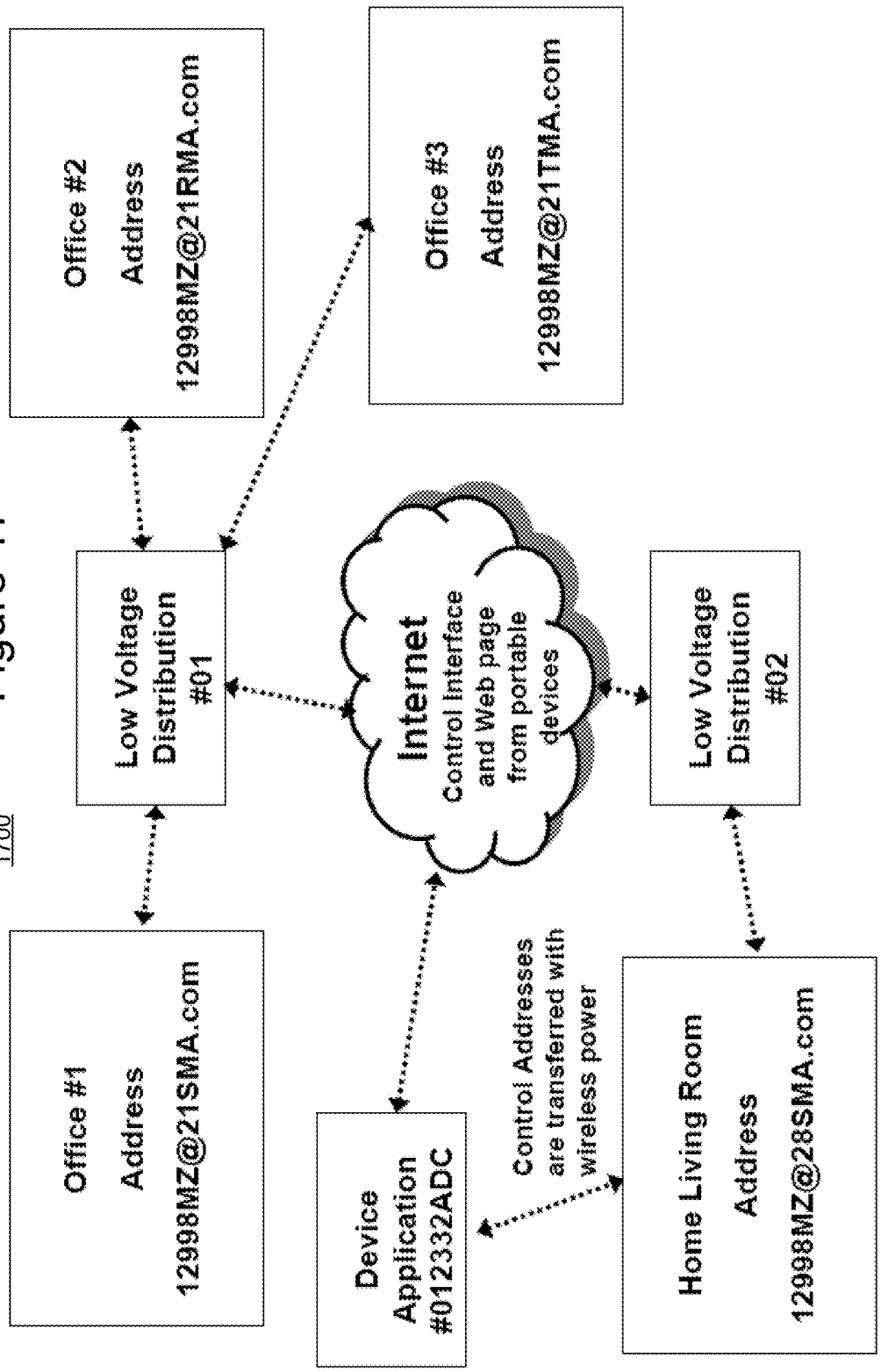
FIG. 17 illustrates control using addressing and identification.

FIG. 17 illustrates control using addressing and identification. FIG. 17 illustrates how a device may have control using global addressing and identification from the wireless power connection to multiple wireless power distribution systems. Each address may be a local identifier that is shared when power is transferred and may be used for the global control (over the Internet) if global control is allowed. Each device identification may be used for part of an address along with a hub address (e.g. for a master power supply) and power supply identification when controlling remotely. Each power supply may also assigned an identification number for node to node control within the network. In one embodiment, the identification or addresses are email addresses that are used for communicating information about the system 1700. In one embodiment, an email message may include a command that is used for establishing control.

The system and process described above may be at least partially encoded in a signal bearing medium, a computer readable medium such as a memory, programmed within a device such as one or more integrated circuits, one or more processors or processed by a controller or a computer. That data may be analyzed in a computer system and used to generate a spectrum. If the methods are performed by software, the software may reside in a memory resident to or interfaced to a storage device, synchronizer, a communication interface, or non-volatile or volatile memory in communication with a transmitter. A circuit or electronic device designed to send data to another location. The memory may include an ordered listing of executable instructions for implementing logical functions. A logical function or any system element described may be implemented through optical circuitry, digital circuitry, through source code, through analog circuitry, through an analog source such as an analog electrical, audio, or video signal or a combination.

The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A computer-readable medium, machine readable medium, propagated-signal medium, and/or signal-bearing medium may comprise any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description. While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A wireless power distribution system comprising:
    a wireless power supply configured to provide power;
    one or more remote devices that receive power wirelessly from the wireless power supply; and
    one or more wireless power links between the wireless power supply and the one or more remote devices for the wireless power transmission, wherein the wireless power links provide for communication of information over the wireless power distribution system to a remote device of the one or more remote devices, wherein the information that is communicated comprises a listing of other devices in the wireless power distribution system than the remote device of the one or more remote devices.

2. The system of claim 1 wherein the information that is communicated is encoded based on load modulation of the wireless power links.

3. The system of claim 2 wherein the load modulation comprises rail voltage modulation or frequency-shift keying modulation.

4. The system of claim 1 wherein the other devices in the wireless power distribution system includes at least one of devices connected to the wireless power supply and a different remote device that receives power wirelessly from the wireless power supply than the remote device of the one or more remote devices that receive power wirelessly from the wireless power supply.

5. The system of claim 1 wherein each of the remote devices is coupled with the wireless power supply through a different one of the wireless power links.

6. The system of claim 5 wherein the remote devices can communicate the information between one another through the wireless power links with the wireless remote power supply.

7. The system of claim 1 further comprising:
a controller device that is configured to wirelessly receive power from the wireless power supply, wherein the information comprises information about the remote devices that is transmitted over one of the wireless power links.

8. The system of claim 7 wherein the controller device is further configured to receive the information when not wirelessly receiving power from the wireless power supply.

9. The system of claim 7 wherein the information comprises control commands that allow the controller device to control the remote devices.

10. The system of claim 9 wherein the controller device can control the remote devices without wirelessly receiving power from the wireless power supply.

11. The system of claim 10 wherein the information comprises access codes, wherein the access codes are required before the controller device can control the remote devices.

12. The system of claim 11 wherein the information comprises access codes for accessing features, such as a wireless network for enabling communication.

13. The system of claim 1 wherein the information comprises identification information for the wireless power supply or the one or more remote devices.

14. A method for communicating in a wireless power network comprising:
providing, by a wireless power supply, wireless power to one or more devices in the wireless power network when in proximity of a wireless power supply;
establishing a power channel for each of the one or more devices from the wireless power supply;
providing power wirelessly to each of the devices from the wireless power supply through the respective power channel; and
facilitating communication of information between the wireless power supply and each of the devices through the respective power channel, wherein the information that is communicated from the wireless power supply to a remote device of the one or more devices includes a listing of other devices in the wireless power network.

15. The method of claim 14 wherein the communication of the information is through load modulation of wireless power transmission or through frequency-shift keying modulation.

16. The method of claim 14 further comprising:
receiving communications between the devices at the wireless power supply; and
transmitting the communications between the devices.

17. The method of claim 14 wherein the other devices in the wireless power network includes at least one of the devices connected to the wireless power supply and one or more different remote devices that receives power wirelessly from the wireless power supply than the remote device of the one or more remote devices that receive power wirelessly from the wireless power supply.

18. The method of claim 14 further comprising:
receiving, at each of the one or more devices, an identification of a wireless power supply when the remote device of the one or more devices is within a proximity of the wireless power supply;
authorizing, by the device proximate the wireless power supply, a wireless transfer of power from the wireless power supply, wherein the authorizing utilizes the identification;
communicating information from the wireless power supply to the device proximate the wireless power supply upon the authorization for the wireless power transfer; and
receiving, from an external controller device, control commands that control one or more devices in the wireless power network.

19. The method of claim 18 wherein the external controller device is located externally from the wireless power supply and the remote device and the other devices in the wireless power network, further wherein the external controller device is configured to provide control commands for the other devices in the wireless power network from the external location.

20. In a non-transitory computer readable storage medium having stored therein data representing instructions executable by a programmed processor for establishing communication in a wireless power distribution network, the storage medium comprising instructions operative for:
identifying a device to be charged by a wireless power supply;
receiving identification from the device;
providing wireless charge based on the identification thorough a power control channel;
establishing a communications link between the device and the wireless power supply through the power control channel; and
communicating information over the communication link from the device to the wireless power supply, wherein the information that is communicated comprises a listing of other devices in the wireless power distribution network than the device.

* * * * *